United States Patent [19]

Gubbels

[11] 4,030,167

[45] June 21, 1977

[54] GARMENT CLASP

[76] Inventor: Christoph Gubbels, Wellingsbutteler Weg near 32, D-2000 Hamburg 64, Germany

[22] Filed: Oct. 12, 1976

[21] Appl. No.: 731,534

[30] Foreign Application Priority Data

Oct. 9, 1975 Germany ............................ 2545302

[52] U.S. Cl. ................................ 24/210; 24/252 R
[51] Int. Cl.² ........................................ A44B 17/00
[58] Field of Search ............................. 24/210, 173

[56] References Cited

UNITED STATES PATENTS

| 249,293 | 11/1881 | Blinn | 24/210 |
| 359,033 | 3/1887 | Prahar | 24/210 |

Primary Examiner—Bernard A. Gelak
Attorney, Agent, or Firm—Walter Becker

[57] ABSTRACT

A garment clasp with a base plate having connected thereto, preferably formed thereon bearing members in which by means of a bearing pin there is pivotally mounted a substantially L-shaped clip which by means of a spring arranged in the base plate is held in a stable position both in its open position and its closed position, in which latter the free end of the clip comes to bear against a stud carried by the base plate. Laterally on the clip in the vicinity of the bearing members therefor there are provided channel-shaped detent recesses for a U-shaped wire spring having substantially parallel legs preloaded in their engaging direction.

6 Claims, 4 Drawing Figures

U.S. Patent  June 21, 1977  4,030,167
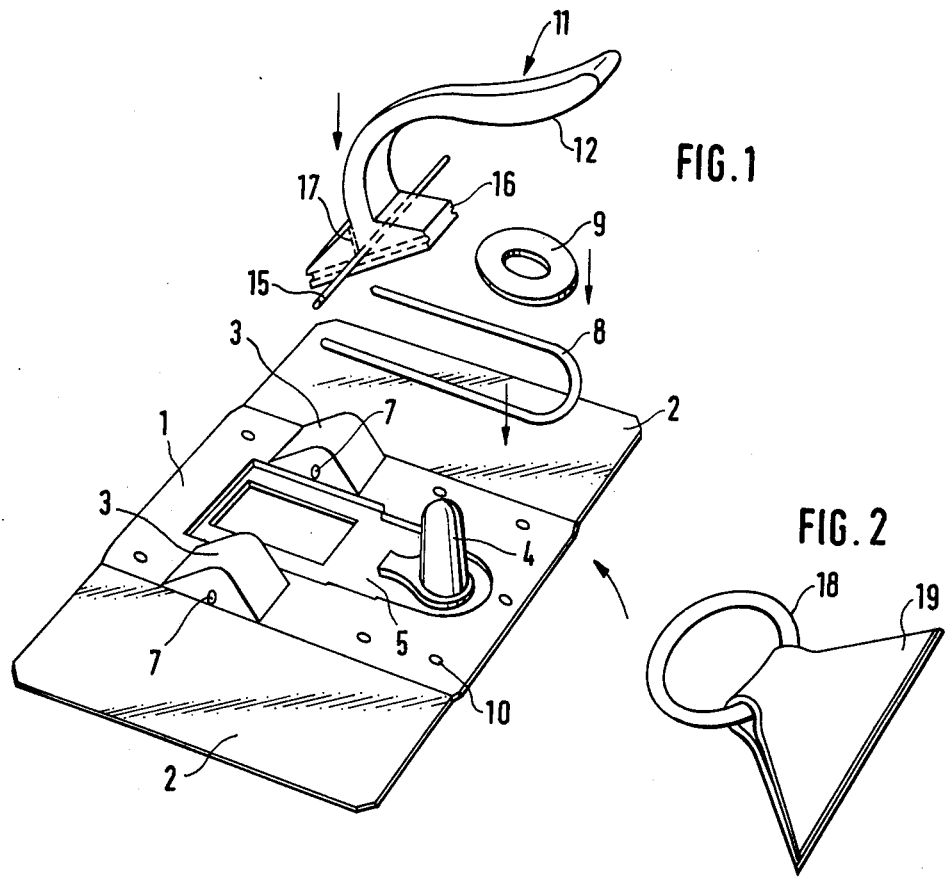
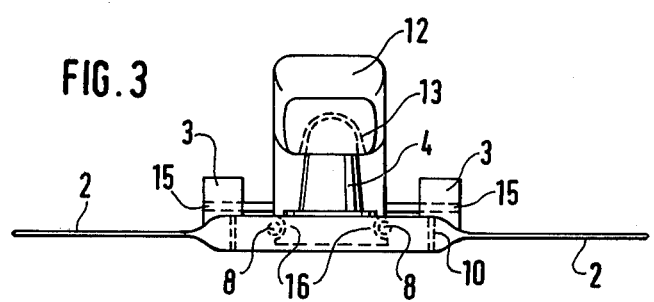
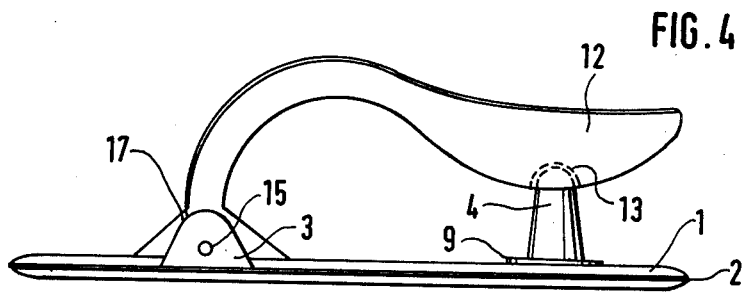

GARMENT CLASP

The present invention relates to a garment clasp which is particularly suitable for fur articles of clothing, with a base plate on which a substantially L-shaped clip is pivotally mounted with formed-on bearings and a pivot pin. This clip is held in a stable position by a spring disposed in the base plate, both in the open position and in the closed position in which its free end bears against a stud carried by said base plate.

Heretofore known clasps of the above mentioned kind generally cooperate with a leaf spring which is disposed in the base plate and on which the clip rests in its two limit positions by means of stops which are disposed in the region of the pivot axis. Because of these extensions on the clip and because of the high spring forces, the base plate of the clasp had to consist of metal and had to have a wall thickness which in many cases prevented an invisible, non-bulky fitting of the clasp.

It is, therefore, an object of the present invention to provide an improved garment clasp of the kind referred to above, which manages with a very thin-salled base plate, can be sewn on directly with a sewing machine and in addition thereto is particularly simple to manufacture and to assemble.

The garment clasp according to the invention is characterized primarily in that laterally on the clip, in the vicinity of its bearing arrangement there are provided channel-shaped detent recesses for a U-shaped wire spring which is mounted in a recess in the base plate and the arms of which extend substantially parallel to one another and are pre-loaded in the engagement direction. As a result of this lateral arrangement of the detent device and the use of a wire spring which only stresses the base plate in its plane, a particularly thin base plate will do, the thickness of which only slightly exceeds the diameter of the wire of which the wire spring is made. The channel-shaped detent recesses are preferably provided at the axially outwardly located lateral faces of the clip.

A further feature of the invention is characterized in that the U-shaped spring extends around the stud carried by the base plate and is held by a holding member which is slipped over the stud. If the base plate and the stud consist of plastics material — as is to be preferred — the holding member may be an annular disc pressed onto the stud. In order to secure the position of the U-shaped spring, its free arms may be located underneath the pivot pin of the clip.

Preferably, the base plate of the garment clasp consists of plastics material and is provided with lateral flaps which are formed thereon and which can be perforated with a sewing needle.

The invention is illustrated by way of example in the accompanying drawing, in which:

FIG. 1 shows an exploded isometric view of the garment clasp according to the invention.

FIG. 2 is a perspective illustration of a holding eye with attachment flaps provided for the garment clasp.

FIG. 3 shows a front view of the clasp of FIG. 1 in its closed state, and

FIG. 4 represents a side view of FIG. 3.

The clasp illustrated in FIG. 1 comprises only five components, namely a base plate 1, an L-shaped clip 11, a pivot pin 15, a U-shaped wire spring 8, and an annular disc 9 serving to secure the wire spring 8.

The base plate 1 and the clip 11 preferably consist of plastics material. The base plate 1 is provided with lateral extensions 2 in the form of flaps which, as FIG. 3 shows, are made so thin that they can be perforated with a needle. This affords the possibility of sewing the base plate 1 to the article of clothing with a sewing machine. Formed on the base plate 1 aretwo bearing blocks 3 which are disposed opposite one another, and have bearing bores 7 receiving the pivot pin 15 of the clip 11. In the central portion of the base plate 1, between the two bearings 3, there is a recess 5 which has a rectangular aperture in which the foot portion of the clip 11 can move. At that side of the base plate 1 which is remote from the bearings 3 there is provided a stud 4, on which the free end 12 of the clip 11 can rest in its closing position. The recess 5 is so designed that it can receive a U-shaped wire spring 8. The central portion of the wire spring 8 straddles the stud 4 while the free ends of the wire spring 8, which are initially tensioned in the inward direction, lie between the two bearings 3. The annular disc 9, which is pressed onto the stud 4 after insertion of the spring 8 serves to hold the wire spring 8. As FIGS. 3 and 4 show, the wire spring 8 is further held in the recess 5 by the ends of the pivot pin 15.

Whereas in the known clasps of the kind referred to, at the beginning, the foot portion of the clip is supported on a leaf spring, according to the present invention channel-shaped detent recesses 16 and 17 are provided on the foot portion of the clip 11, at both sides, in two directions which are substantially perpendicular to one another. In the closed position illustrated in FIGS. 3 and 4, the free arms of the U-shaped wire spring 8 act on the two channels 16 whereas, when the clasp is open, they will lie in the two channels 17.

A bowl-shaped recess 13, which extends over the stud 4, may be provided at the free end of the clip 11, at the underside thereof.

If it is desired to rivet the clasp on or to sew it on by hand, the lateral flaps 2 may be cut off with scissors so as then to pass the attachment threads or rivets through marginal bores 10.

The counterpart of the clasp is the eye 18 illustrated in FIG. 2 which can likewise be sewn on by machine with an extension 19 which can be perforated by needles. When using the clasp, the eye is generally fitted so that it acts on the closing clip 11 in the vicinity of the pivot pin 15.

It is, of course, to be understood that the present invention is, by no means, limited to the specific showing in the drawings, but also comprises any modifications within the scope of the appended claims.

Thus, the U-shaped spring may also be initially tensioned in the parting direction, in which case the foot portion of the clip 11 is made in two parts and the channels 16 and 17 are disposed at the boundary side walls of the two clip foot portions.

What is claimed is:

1. A garment clasp construction which includes: a base plate, bearing block means arranged on said base plate and located in spaced substantially parallel relationship to each other, a longitudinally extending substantially L-shaped clasp member having a foot portion with a bearing pin laterally protruding from both sides of said foot portion and extending in a direction transverse to the longitudinal extension of said clasp member, said laterally protruding portions of said bearing pin being pivotally journalled in said bearing block means to permit shifting said clasp member selectively from a first position representing the open position of said clasp member to a second position representing the closing position of said clasp member, and vice versa, stud means mounted on said base plate in substantial alignment with the vertical central plane through said clasp member and perpendicular to said base plate for resting said clasp member in its closed position, said foot portion of said clasp member being provided with at least two channel-shaped detent recess means arranged at an angle to each other corresponding to the shifting angle from said opening to said closing position of said clasp member, said base plate having that surface thereof which faces said clasp member provided with a recess, and U-shaped spring means fastened onto said stud means and arranged in said recess, the legs of said U-shaped spring means being pre-loaded for engaging said detent recess means.

2. A clasp according to claim 1, in which said detent recess means are arranged on both sides of said foot portion with each two recess means forming an angle with each other located substantially in the same plane.

3. A clasp according to claim 1, in which said U-shaped spring means straddles said stud, and which includes holding means placed upon said stud for holding said spring means in position.

4. A clasp according to claim 1, in which said base plate and said stud are of synthetic material, and in which said holding means consists of an annular disc pressed upon said stud.

5. A clasp according to claim 1, in which the free legs of said U-shaped spring means are located below said bearing pin.

6. A clasp according to claim 1, which includes lateral flaps formed onto said base plate and having a thickness less than said base plate and perforatable by a sewing needle.

* * * * *

UNITED STATES PATENT OFFICE
CERTIFICATE OF CORRECTION

Patent No. 4,030,167  Dated June 21, 1977

Inventor(s) Christoph Gubbels

It is certified that error appears in the above-identified patent and that said Letters Patent are hereby corrected as shown below:

[76] Inventor: Christoph Gubbels, Wellingsbütteler Weg
Nr. 32, D-2000 Hamburg 64, Germany Signed and Sealed this First Day of November 1977

[SEAL]

Attest:

RUTH C. MASON  
Attesting Officer

LUTRELLE F. PARKER  
Acting Commissioner of Patents and Trademarks